March 19, 1963   H. A. TRISHMAN   3,081,901
CLOSURE
Filed Nov. 14, 1961
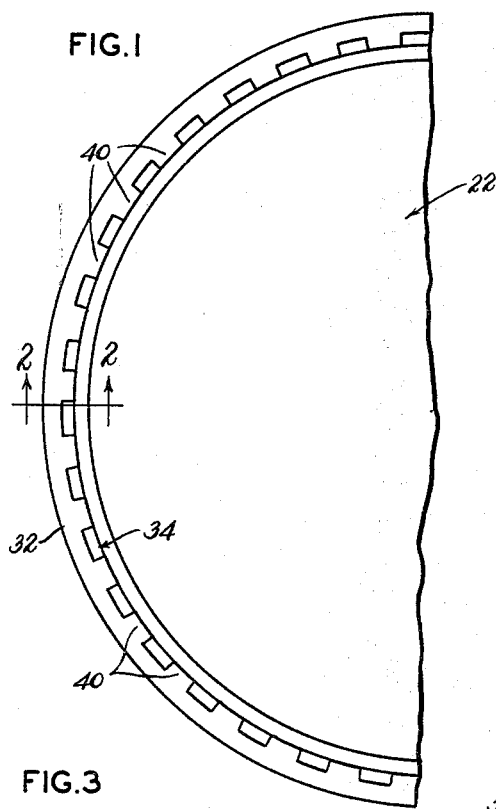
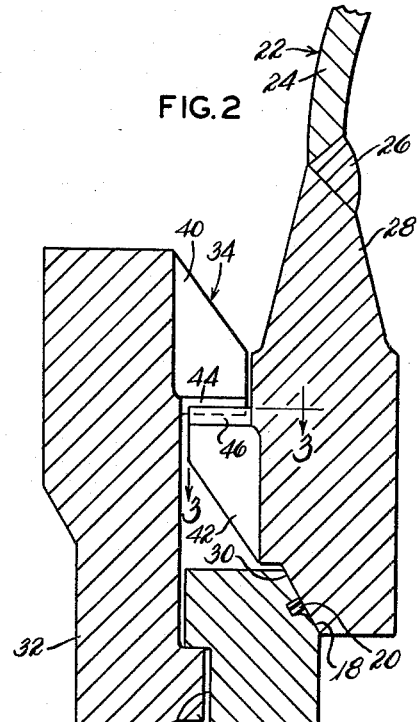
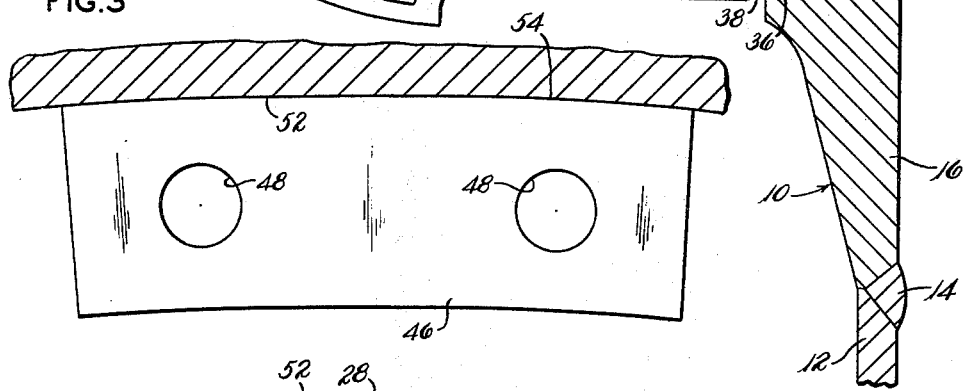
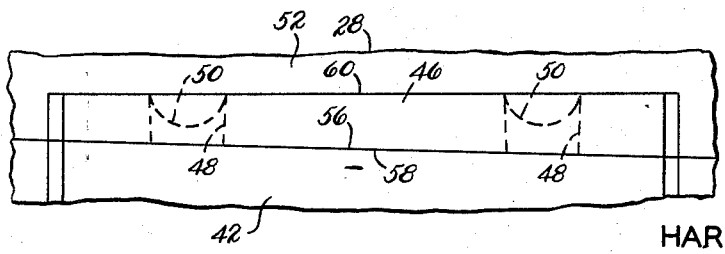
INVENTOR.
HARRY A. TRISHMAN
BY
Oldham & Oldham
ATTYS.

United States Patent Office 3,081,901
Patented Mar. 19, 1963

3,081,901
CLOSURE
Harry A. Trishman, Hudson, Ohio, assignor to Adamson United Company, Akron, Ohio, a corporation of Ohio
Filed Nov. 14, 1961, Ser. No. 152,194
2 Claims. (Cl. 220—40)

This invention relates to sealed, quickly releasable closures for pressure vessels, and the like, and, more particularly, is concerned with fluid-tight, quickly operable closures for autoclaves and similar structures.

Various types of closures have been proposed and constructed heretofore for sealing autoclaves, and other pressure vessels, and wherein the closure means can be readily released and opened to allow access to the inside of the autoclave. One well-known closure utilized in the indicated capacity is a bayonet type joint between the end of the pressure vessel and the closure door, the interlocking lugs of the bayonet joint having cooperating wedge-shaped surfaces for wedging the closure door into sealing relation with the end of the pressure vessel upon relative rotation between the interlocking lugs. However, when pressure vessels are of relatively large size, with some of them being over 100 inches in diameter, the machining of surfaces requires relatively large tools, which is often objectionable. In addition, flat wedging surfaces result in line contact between the interengaging lugs, and if high pressures are developed in the pressure vessel, such line contact is not good. Efforts to form other than a flat wedging surface on the interengaging lugs in an effort to avoid line contact unduly complicate machining operations as aforesaid.

It is the general object of the present invention to avoid and overcome the foregoing and other difficulties of and objections to prior art practices by the provision of a relatively simple, inexpensive, easily constructed, and maintenance-free closure of the bayonet joint type in a pressure vessel characterized by surface to surface contact over the entire area of engagement between adjacent lugs.

Another object of the invention is to provide interengaging lugs of the bayonet type in a closure, said lugs having interengaging face portions formed as circumferentially short square-shouldered threads, the interengaging portions each forming a separate thread starting at points spaced circumferentially from each other but lying in the same plane.

Another object of the invention is to provide a closure of the bayonet joint type wherein the interlocking lugs can be machined to cylindrical surfaces and/or surfaces lying in a flat plane perpendicular to the axis of the joint, each lug then being provided with an interengaging face plate which can be quickly and inexpensively formed, as by casting, the interengaging surfaces of the face plates being formed as a square-shouldered screw thread.

The foregoing objects of the invention, and other objects which will become apparent as the description proceeds, are achieved by the provision in an autoclave and the like a pressure vessel, a closure door for the vessel, interlocking bayonet joint lugs carried on the door and carried on the vessel, and interengaging facing plates secured to the lugs, the interengaging portions of the plates being formed as the surfaces of square screw threads having a pitch diameter about equal to the diameter of the lugs, a pitch sufficient to effect a sealing closure between the vessel and door upon relative rotation of the lugs a distance less than the circumferential length of a lug, and with each interengaging portion of the plates forming a separate thread starting at points spaced circumferentially from each other but lying in the same plane at right angles to the axis of the door.

For a better understanding of the invention reference should be had to the accompanying drawings wherein FIG. 1 is an end elevation, partially broken away, of an autoclave closure involving the principles of the invention;

FIG. 2 is an enlarged fragmentary cross-sectional view taken substantially on line 2—2 of FIG. 1;

FIG. 3 is an enlarged fragmentary cross-sectional view taken substantially on line 3—3 of FIG. 2; and FIG. 4 is a front elevation of the facing plate illustrated in FIG. 3.

In the drawings, the numeral 10 indicates generally a pressure vessel, such as an autoclave, usually having a cylindrical closed end body portion 12 to the open end of which is welded, as at 14, a ring 16 formed with a beveled or flat inner face 18 carrying a sealing ring 20, such as a compression type gasket. It will be understood that various type gaskets can be utilized, for example a rubber gasket for low temperature use, a gasket having copper wires buried in asbestos, for higher temperature use, a pressurized steel tube which can be expanded into and out of sealing relation, for high pressure use, and the like. The exact details of the gasket means do not per se form any part of the invention.

Cooperating with the pressure vessel 10 is a closure door indicated as a whole by the numeral 22, and usually including a dish-shaped door 24 welded, as at 26, to a ring 28 having a tapered or flat sealing surface 30 adapted to engage in sealing relation with the tapered or flat surface 18 and gasket 20.

The bayonet joint means of the invention can be provided directly between the pressure vessel 10 and the closure 22, with interengagement between the interlocking lugs being effected by relative rotation between the pressure vessel 10 and the closure 22, all in known manner.

However, in the embodiment of the invention illustrated most particularly in FIG. 2, a locking ring 32 is rotatably mounted upon the pressure vessel 10 and the bayonet joint means, indicated as a whole by the numeral 34, are provided between the locking ring 32 and the closure 22. More specifically, the locking ring 32 is formed with a right angle flange 36 which slidably engages for rotary movement in a groove 38 cut in the outer periphery of the ring 16. The locking ring 32 is formed with bayonet lugs 40 which interlock with bayonet lugs 42 formed on the ring 28 of the closure 22. The lugs 40 and 42 stab between each other and upon relative rotation of the closure 22 and the locking ring 32 the lugs 40 and 42 interlock one behind the other, all in known manner.

A face plate 44 is provided on each lug 40, and a face plate 46 on each lug 42, with these face plates interengaging with each other in the manner shown in FIG. 2. Each face plate is of a circumferential length equal to the circumferential length of its associated lug, and each face plate has a radial dimension equal to the radial dimension of the lug.

FIGS. 3 and 4 better illustrate the construction of each face plate, and in these figures of the drawing the face plate 46 is illustrated as being secured to the lug 42 of the ring 28 by forming holes 48 in the face plate and welding, as at 50, down in the holes. Of course, other means for securing the face plates to the lugs could be utilized, such as circumferential welding or countersunk screws.

The surface 52 of the ring 28 is preferably machined cylindrically to engage the cylindrical surface 54 of the shoe 46 and the surface 56 of the lug 42 is machined radially flat to engage the flat undersurface 58 of the face plate 46. Stated in another way, the surface 56 of the lug 42 is machined to lie in a plane coincident with all other surfaces 56 of the other lugs 42, this plane being at a right angle to the axis of the ring 28 and closure 22.

The outer surface of the face plate 46, indicated by the numeral 60 is formed as a square thread or square thread shoulder of a screw thread having a pitch diameter equal to the diameter of the lugs 42 and having a pitch such that the sealing surfaces 18 and 30 are brought into sealing engagement upon relative rotation between the lock ring 32 and the closure 22 of about the circumferential length of a lug, or just something less than the circumferential length of a lug.

Each surface 60 of the face plate 46, and the engaging surface of the face plate 44 thus forms a helical surface as a separate thread starting at points spaced circumferentially from each other but lying in the same plane at right angles to the axis of the ring 28 and the axis of the closure door 22.

The face plates 44 and 46 could be machined to the structure illustrated and described, for example by using fixtures or templates to guide a cutting tool to cut the screw thread surface 60, but it has been found to be more convenient to make a plurality of precision cast face plates which require little or no machining, or which are machined by a separate operation, these then being appropriately welded in place in the manner described.

The construction provided by the invention results in a relatively inexpensive highly effective readily operated closure for an autoclave, or the like, utilizing high pressures and/or temperatures, and with the interengaging face plates of the lugs bearing on each other over their entire surfaces which are interlocked, thereby giving the assembly not only high strength but long and maintenance-free service.

While a certain representative embodiment and details have been shown for the purpose of illustrating the invention, it will be apparent to those skilled in this art that various changes and modifications may be made therein without departing from the spirit or scope of the invention.

What is claimed is:

1. In an autoclave and the like a pressure vessel, a closure door for the vessel, interlocking bayonet joint lugs carried on the door and carried on the vessel, and interengaging facing plates secured to the lugs, the interengaging portions of the plates being formed as the surfaces of square screw threads having a pitch diameter about equal to the diameter of the lugs, a pitch sufficient to effect a sealing closure between the vessel and door upon relative rotation of the lugs a distance less than the circumferential length of a lug, and with each interengaging portion of the plates forming a separate thread starting at points spaced circumferentially from each other but lying in the same plane at right angles to the axis of the door.

2. In an autoclave and the like a pressure vessel, a closure door for the vessel, interlocking bayonet joint lugs carried on the door and carried on the vessel, said lugs having interengaging portions formed as the surfaces of square shoulder screw threads having a pitch diameter about equal to the diameter of the lugs, a pitch sufficient to effect a sealing closure between the vessel and door upon relative rotation of the lugs a distance less than the circumferential length of a lug, and with each interengaging portion of the lugs forming a separate thread starting at points spaced circumferentially from each other but lying in the same plane at right angles to the axis of the door.

References Cited in the file of this patent

UNITED STATES PATENTS 2,879,914     Fleckenstein     Mar. 31, 1959

FOREIGN PATENTS 171,712     Switzerland     Sept. 15, 1934